United States Patent Office 2,984,694
Patented May 16, 1961

2,984,694

ANTIOZONATION OF RUBBER WITH SUBSTITUTED PHENOLS

William K. T. Gleim, Island Lake, Ill., assignor, by mesne assignments, to Universal Oil Products Company, Des Plaines, Ill., a corporation of Delaware No Drawing. Filed May 1, 1958, Ser. No. 732,139

8 Claims. (Cl. 260—810)

This invention relates to the antiozonation of rubber and more particularly to a novel method of preventing cracking of rubber due to ozone.

Cracking of rubber due to ozone is an entirely different problem from the deterioration of rubber caused by oxygen. The cracking caused by ozone is a surface reaction, and the resulting cracks appear to be the focal point for failure caused by flex fatigue. On the other hand, oxidation is not limited to only a surface reaction and results in loss of elongation properties. Because the causes and effects are different, inhibitors which will prevent one type of deterioration will not necessarily prevent the other type of deterioration. In fact, practically all antioxidants being used commercially are of no effect in preventing cracking due to ozone.

The ozone cracking problem is further complicated by the fact that, while a specific type of compound will retard such cracking, similar but different compounds of the same class are ineffective for this purpose. In other words, the cracking effect is very specific and will respond satisfactorily to only very limited type of compounds. This specific effect will be illustrated in detail with reference to the examples appended to the present specifications.

This problem is further complicated in connection with the treatment of white or light colored rubber. The additive used in such rubber must of necessity be non-staining so that it does not impart undesirable color to the rubber. Furthermore, when white or light colored rubber is joined to dark colored rubber as, for example, in the case of whitewall tires for automobiles or the like, it is necessary that the black rubber also contain a non-staining antiozonant in order to avoid discoloration of the adjoining white or light colored rubber.

In accordance with the present invention, ozone cracking of white or light colored rubber is prevented by incorporating a novel additive therein. This invention also may be used to prevent ozone cracking of black or dark colored rubber and particularly of such rubber which adjoins light colored rubber. The present invention is particularly applicable to the stabilization of natural rubber. Natural rubber generally is regarded as comprising naturally occurring isoprene polymers. Natural rubbers include Hevea rubber, caoutchouc, balata, gutta percha, etc.

While the present invention is particularly applicable for use in natural rubber, it is understood that the invention can be used for preventing ozone cracking in synthetic rubber. Much of the synthetic rubber now being produced commercially is known in the art as SBR rubber and is a copolymer of butadiene and styrene. Other synthetic rubbers include those produced from butadiene and acrylonitrile (Buna-N), butadiene and isobutylene (butyl rubber), etc. Still other synthetic rubbers include Thiokol rubber, silicone rubber, neoprene rubber, etc.

During processing, the rubber is subjected to sulfur vulcanization. In this step the rubber is cured by reaction with either free sulfur or a vulcanizing agent of the sulfur-donor type. These are well known and include, for example, various phenol polysulfides, thiuram polysulfides, etc. Generally an accelerator is used to speed up the vulcanization process and these also are well known in the art. The vulcanization may be effected at a temperature ranging from room temperature to 200° C. or more and at a time ranging from several seconds to a few hours or more.

In one embodiment the present invention relates to a method of preventing cracking of sulfur-vulcanizable rubber due to ozone, which comprises incorporating therein an antiozonant concentration of an antiozonant having the following structure:

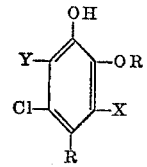

where R is a primary alkyl group containing from 1 to 6 carbon atoms, X is selected from the group consisting of Cl and H, Y is selected from the group consisting of Cl and OR, and when Y is OR, X is H.

In a specific embodiment the present invention relates to a method of preventing cracking of light colored natural rubber due to ozone which comprises incorporating in said rubber an antiozonant concentration of 2-methoxy-4-methyl-5,6-dichlorophenol.

In another embodiment the present invention relates to rubber stabilized against cracking due to ozone by incorporating in the rubber an antiozonant concentration of the antiozonant herein set forth.

From the structure hereinbefore set forth, it will be noted that the antiozonant of the present invention must meet certain critical requirements. The antiozonant is a particularly substituted phenol, which may contain 1, 2, or 3 chloro substitutions, but only 1 chloro substitution when there are 2 alkoxy substitutions. Furthermore, the alkyl group attached in the 4-position must be a primary alkyl group containing from 1 to 6 carbon atoms. By primary alkyl group it is meant that the alkyl group is attached to the ring at a terminal carbon atom, which alkyl group may contain branching in its chain or it may be a normal alkyl group. Similarly, the alkyl radical of the alkoxy group must be attached to an oxygen atom at a terminal carbon atom and also may or may not contain in branching in the chain or intermediate carbon atoms.

Referring to the general structure hereinbefore set forth, where X is hydrogen and Y is chlorine, a preferred antiozonant comprises 2-methoxy-4-methyl-5,6-dichlorophenol. Other antiozonants in this group include 2-ethoxy-4-methyl-5,6-dichlorophenol,
2-propoxy-4-methyl-5,6-dichlorophenol,
2-butoxy-4-methyl-5,6-dichlorophenol,
2-pentoxy-4-methyl-5,6-dichlorphenol,
2-hexoxy-4-methyl-5,6-dichlorophenol,
2-methoxy-4-ethyl-5,6-dichlorophenol,
2-ethoxy-4-ethyl-5,6-dichlorophenol,
2-propoxy-4-ethyl-5,6-dichlorophenol,
2-butoxy-4-ethyl-5,6-dichlorophenol,
2-pentoxy-4-ethyl-5,6-dichlorophenol,
2-hexoxy-4-ethyl-5,6-dichlorophenol,
2-methoxy-4-propyl-5,6-dichlorophenol,
2-ethoxy-4-propyl-5,6-dichlorophenol,
2-propoxy-4-propyl-5,6-dichlorophenol,
2-butoxy-4-propyl-5,6-dichlorophenol,
2-pentoxy-4-propyl-5,6-dichlorophenol,
2-hexoxy-4-propyl-5,6-dichlorophenol, 2-methoxy-4-butyl-5,6-dichlorophenol,
2-ethoxy-4-butyl-5,6-dichlorophenol,
2-propoxy-4-butyl-5,6-dichlorophenol,
2-butoxy-4-butyl-5,6-dichlorophenol,
2-pentoxy-4-butyl-5,6-dichlorophenol,
2-hexoxy-4-butyl-5,6-dichlorophenol,
2-methoxy-4-pentyl-5,6-dichlorophenol,
2-ethoxy-4-pentyl-5,6-dichlorophenol,
2-propoxy-4-pentyl-5,6-dichlorophenol,
2-butoxy-4-pentyl-5,6-dichlorophenol,
2-pentoxy-4-pentyl-5,6-dichlorophenol,
2-hexoxy-4-pentyl-5,6-dichlorophenol,
2-methoxy-4-hexyl-5,6-dichlorophenol,
2-ethoxy-4-hexyl-5,6-dichlorophenol,
2-propoxy-4-hexyl-5,6-dichlorophenol,
2-butoxy-4-hexyl-5,6-dichlorophenol,
2-pentoxy-4-hexyl-5,6-dichlorophenol and
2-hexoxy-4-hexyl-5,6-dichlorophenol.

Referring again to the above structure, where X and Y are both chlorine radicals, a preferred antiozonant comprises 2-methoxy - 4 - methyl - 3,5,6-trichlorophenol. Other antiozonants in this class include 2-ethoxy-4-methyl-3,5,6-trichlorophenol,
2-butoxy-4-methyl-3,5,6-trichlorophenol,
2-pentoxy-4-methyl-3,5,6-trichlorophenol,
2-hexoxy-4-methyl-3,5,6-trichlorophenol,
2-methoxy-4-ethyl-3,5,6-trichlorophenol,
2-ethoxy-4-ethyl-3,5,6-trichlorophenol,
2-butoxy-4-ethyl-3,5,6-trichlorophenol,
2-pentoxy-4-ethyl-3,5,6-trichlorophenol,
2-hexoxy-4-ethyl-3,5,6-trichlorophenol,
2-methoxy-4-propyl-3,5,6-trichlorophenol,
2-ethoxy-4-propyl-3,5,6-trichlorophenol,
2-butoxy-4-propyl-3,5,6-trichlorophenol,
2-pentoxy-4-propyl-3,5,6-trichlorophenol,
2-hexoxy-4-propyl-3,5,6-trichlorophenol,
2-methoxy-4-butyl-3,5,6-trichlorophenol,
2-ethoxy-4-butyl-3,5,6-trichlorophenol,
2-butoxy-4-butyl-3,5,6-trichlorophenol,
2-pentoxy-4-butyl-3,5,6-trichlorophenol,
2-hexoxy-4-butyl-3,5,6-trichlorophenol,
2-methoxy-4-pentyl-3,5,6-trichlorophenol,
2-ethoxy-4-pentyl-3,5,6-trichlorophenol,
2-butoxy-4-pentyl-3,5,6-trichlorophenol,
2-pentoxy-4-pentyl-3,5,6-trichlorophenol,
2-hexoxy-4-pentyl-3,5,6-trichlorphenol,
2-methoxy-4-hexyl-3,5,6-trichlorophenol,
2-ethoxy-4-hexyl-3,5,6-trichlorophenol,
2-butoxy-4-hexyl-3,5,6-trichlorophenol,
2-pentoxy-4-hexyl-3,5,6-trichlorophenol and
2-hexoxy-4-hexyl-3,5,6-trichlorophenol.

Referring again to the above structure, where X is hydrogen and Y is an alkoxy group, a preferred antiozonant is 2,6-dimethoxy - 4 - methyl - 5 - chlorophenol. Other antiozonants in this group include 2,6-diethoxy-4-methyl-5-chlorophenol,
2,6-dibutoxy-4-methyl-5-chlorophenol,
2,6-dipentoxy-4-methyl-5-chlorophenol,
2,6-dihexoxy-4-methyl-5-chlorophenol,
2,6-dimethoxy-4-ethyl-5-chlorophenol,
2,6-diethoxy-4-ethyl-5-chlorophenol,
2,6-dibutoxy-4-ethyl-5-chlorophenol,
2,6-dipentoxy-4-ethyl-5-chlorophenol,
2,6-dihexoxy-4-ethyl-5-chlorophenol,
2,6-dimethoxy-4-propyl-5-chlorophenol,
2,6-diethoxy-4-propyl-5-chlorophenol,
2,6-dibutoxy-4-propyl-5-chlorophenol,
2,6-dipentoxy-4-propyl-5-chlorophenol,
2,6-dihexoxy-4-propyl-5-chlorophenol,
2,6-dimethoxy-4-butyl-5-chlorophenol,
2,6-diethoxy-4-butyl-5-chlorophenol,
2,6-dibutoxy-4-butyl-5-chlorophenol,
2,6-dipentoxy-4-butyl-5-chlorophenol,
2,6-dihexoxy-4-butyl-5-chlorophenoy,
2,6-dimethoxy-4-pentyl-5-chlorophenol,
2,6-diethoxy-4-pentyl-5-chlorophenol,
2,6-dibutoxy-4-pentyl-5-chlorophenol,
2,6-dipentoxy-4-pentyl-5-chlorophenol,
2,6-dihexoxy-4-pentyl-5-chlorophenol,
2,6-dimethoxy-4-hexyl-5-chlorophenol,
2,6-diethoxy-4-hexyl-5-chlorophenol,
2,6-dibutoxy-4-hexyl-5-chlorophenol,
2,6-dipentoxy-4-hexyl-5-chlorophenol and
2,6-dihexoxy-4-hexyl-5-chlorophenol.

It is understood that the various antiozonant compounds which may be used in accordance with the present invention are not necessarily equivalent in the same or different rubbers. However, all of them will be effective in preventing cracking or rubber due to ozone.

As hereinbefore set forth, the response to inhibitor action to prevent ozone cracking is very selective and it is essential that the antiozonant for use in the present invention meets the requiremens hereinbefore set forth. Chloro substitution appears to be peculiar in this use because compounds similarly substituted with bromine instead of chlorine are not effective to prevent ozone cracking. Furthermore, compounds in which an alkyl group of tertiary configuration are attached in the 4-position is not effective. Still further, compounds having chloro substitution in different positions were not effective. Specific illustrations of these compounds will be included in the examples appended to the present specifications.

In general, the antiozonant is utilized in a concentration of from about 0.25 to 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozonant of the present invention is utilizable along with other additives incorporated in rubber for specific purposes including, for example, antioxidants, accelerators, softeners, extenders, wax, reinforcing agents, etc.

The antiozonant of the present invention is incorporated in rubber or rubbery products in any suitable manner and at any suitable stage of preparation. When the antiozonant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

*Example I*

The data of the present example were obtained with a rubber of the following recipe:

| Ingredient: | Parts by weight |
|---|---|
| Pale crepe | 100 |
| Stearic acid | 3 |
| Zinc oxide | 75 |
| Sulfur | 3 |
| Accelerator [1] | 1 |
| Titanium dioxide | 25 |
| Antiozonant (when employed) | 2 |

[1] Mercaptobenzothiazyl disulfide.

The rubber was subjected to a 40 minute cure at 140° C.

The rubber was evaluated in a Bent-Loop Test in which different samples of the rubber were cut into strips and then subjected to an atmosphere containing 35 parts of ozone per 100 million parts of air in an ozone cabinet at room temperature. In this dynamic test, the strips underwent 320 flexes per minute.

Control strips of the rubber (not containing an antiozonant) when evaluated in the above manner underwent visible cracking within 2 hours. On the other hand, another sample of the rubber containing 2 parts by weight of 2-methoxy-4-methyl-5,6-dichlorophenol, after evaluation in the above manner, was free from cracks after 3.5 hours and showed only very slight cracks after 20 hours. In contrast, the sample not containing antiozonant was very extensively cracked after 20 hours in the ozone cabinet.

*Example II*

As hereinbefore set forth, the particular substitutions and the points of substitution are vital. This is illustrated in the present example where similar but different compounds were incorporated in other samples of the rubber described in Example I and evaluated in the same manner as described therein. All of these compounds underwent cracking within 2 hours in the ozone cabinet. These ineffective compounds include the following:

2-methoxy-4-methyl-6-chlorophenol
2-methoxy-4,6-dichlorophenol
2,6-dimethoxy-4-methyl-3,5-dichlorophenol
2,6-dichloro-4-methylphenol
2,4,6-trichlorophenol
2,3,4,5,6-pentachlorophenol
2-methoxy-4-methyl-5-bromophenol
2-methoxy-4-methyl-5,6-dibromophenol
2,6-dibromo-4-methylphenol It will be noted that the 2-methoxy-4-methyl-5,6-dibromophenol was ineffective as a stabilizer to retard ozone cracking. On the other hand, from Example I, 2-methoxy-4-methyl-5,6-dichlorophenol was effective in retarding ozone cracking.

*Example III*

The recipe used in the rubber for the present example was as follows:

| Ingredient: | Parts by weight |
|---|---|
| Pale crepe | 100 |
| Stearic acid | 3 |
| Zinc oxide | 5 |
| Sulfur | 3 |
| Accelerator [1] | 1 |
| Antiozonant (when employed) | 2 |

[1] Mercaptobenzothiazyl disulfide.

The rubber was subjected to a 40 minute cure at 140° C.

Different samples of the rubber were subjected to the Bent-Loop Test as described in Example I. A control strip (not containing antiozonant) underwent cracking within 2 hours of exposure in the ozone cabinet.

A sample of the rubber containing 2 parts by weight of 2-methoxy-4-methyl-5,6-dichlorophenol, was free from cracks after 6 hours of exposure in the ozone cabinet and showed only very slight cracks after 24 hours in the ozone cabinet.

*Example IV*

The antiozonant of this example was 2-methoxy-4-methyl-3,5,6-trichlorophenol. A sample of the rubber described in Example III containing 2 parts by weight of this antiozonant was free from cracks after 8 hours in the ozone cabinet and showed only very slight cracks after 16 hours.

*Example V*

The antiozonant of this example was 2,6-dimethoxy-4-methyl-5-chlorophenol. When incorporated in another sample of the rubber described in Example III and evaluated in the same manner, a sample of the rubber containing 2 parts by weight of this antiozonant was free from cracks after 8 hours of exposure in the ozone cabinet and showed only very slight cracks after 16 hours.

As hereinbefore set forth, the response to ozone cracking is very selective. This is further noted by the fact that 2,6-dimethoxy-4-methyl-5-chlorophenol was effective in retarding cracking; whereas, referring to Example II, 2,6-dimethoxy-4-methyl-3,5-dichlorophenol was ineffective for this purpose.

*Example VI*

The antiozonant used in this example is 2-methoxy-4-ethyl-5,6-dichlorophenol. It is incorporated in natural rubber in a concentration of 3 parts by weight and serves to retard cracking of the rubber due to ozone.

*Example VII*

The antiozonant of this example is 2-ethoxy-3-n-propyl-5,6-dichlorophenol and is incorporated in a pale crepe rubber recipe in a concentration of 2.5 parts by weight per 100 parts by weight of the rubber hydrocarbon.

*Example VIII*

The antiozonant of this example is 2,6-dimethoxy-4-n-butyl-5-chlorophenol and is used in a concentration of 4 parts by weight per 100 parts by weight of rubber hydrocarbon. The antiozonant is milled into the rubber recipe prior to vulcanization thereof at 140° C.

I claim as my invention:

1. A sulfur-vulcanizable rubber subject to cracking due to ozone, containing from about 0.25% to about 10% by weight of a phenol having an alkoxy group of from 1 to 6 carbon atoms in the 2-position, an alkyl group of from 1 to 6 carbon atoms in the 4-position, and a chlorine atom in the 5-position and in the 6-position of the benzene ring.

2. Natural rubber containing from about 0.25% to about 10% by weight of a phenol having an alkoxy group of from 1 to 6 carbon atoms in the 2-position, an alkyl group of from 1 to 6 carbon atoms in the 4-position, and a chlorine atom in the 5-position and in the 6-position of the benzene ring.

3. A sulfur-vulcanizable rubber subject to cracking due to ozone, containing from about 0.25% to about 10% by weight of a 2-alkoxy-4-alkyl-5,6-dichlorophenol, in which said alkyl and alkoxy groups each contain from 1 to 6 carbon atoms.

4. A sulfur-vulcanizable rubber subject to cracking due to ozone, containing from about 0.25% to about 10% by weight of a 2-alkoxy-4-alkyl-3,5,6-trichlorophenol, in which said alkyl and alkoxy groups each contain from 1 to 6 carbon atoms.

5. A sulfur-vulcanizable natural rubber containing from about 0.25% to about 10% by weight of a 2-alkoxy-4-alkyl-5,6-dichlorophenol, in which said alkyl and alkoxy groups each contain from 1 to 6 carbon atoms.

6. A sulfur-vulcanizable natural rubber containing from about 0.25% to about 10% by weight of 2-methoxy-4-methyl-5,6-dichlorophenol.

7. A sulfur-vulcanizable natural rubber containing from about 0.25% to about 10% by weight of a 2-alkoxy-4-alkyl-3,5,6-trichlorophenol, in which said alkyl and alkoxy groups each contain from 1 to 6 carbon atoms.

8. A sulfur-vulcanizable natural rubber containing from about 0.25% to about 10% by weight of 2-methoxy-4-methyl-3,5,6-trichlorophenol.

References Cited in the file of this patent

UNITED STATES PATENTS

| 1,970,972 | Orthmer et al. | Aug. 21, 1934 |
| 2,335,089 | Sibley | Nov. 23, 1943 |
| 2,888,503 | Chenicek | May 26, 1959 |

OTHER REFERENCES

Ber. 60B, 1847–50 (1927) (Translation in Chem. Abstracts, Volume 22, page 233).